US012711744B2

(12) United States Patent
Yu et al.

(10) Patent No.: US 12,711,744 B2
(45) Date of Patent: Aug. 18, 2026

(54) HYBRID MODEL FOR VISION SYSTEMS

(71) Applicant: Lemon Inc., Grand Cayman (KY)

(72) Inventors: Qihang Yu, Los Angeles, CA (US); Jieneng Chen, Los Angeles, CA (US); Xiaohui Shen, Los Angeles, CA (US); Liang-Chieh Chen, Los Angeles, CA (US)

( * ) Notice: Subject to any disclaimer, the term of this patent is extended or adjusted under 35 U.S.C. 154(b) by 217 days.

(21) Appl. No.: 18/402,048

(22) Filed: Jan. 2, 2024

(65) Prior Publication Data

US 2025/0218161 A1 Jul. 3, 2025

(51) Int. Cl.

| | |
|---|---|
| ***G06V 10/77*** | (2022.01) |
| ***G06N 3/048*** | (2023.01) |
| ***G06V 10/40*** | (2022.01) |
| ***G06V 10/776*** | (2022.01) |
| ***G06V 10/82*** | (2022.01) |

(52) U.S. Cl.

CPC ......... *G06V 10/7715* (2022.01); *G06N 3/048* (2023.01); *G06V 10/40* (2022.01); *G06V 10/776* (2022.01); *G06V 10/82* (2022.01)

(58) Field of Classification Search

CPC .. G06V 10/7715; G06V 10/40; G06V 10/776; G06V 10/82; G06V 10/806; G06N 3/048; G06N 3/0442; G06N 3/0464; G06N 3/08

USPC .......................................................... 382/100

See application file for complete search history.

(56) References Cited

U.S. PATENT DOCUMENTS

| | | | | |
|---|---|---|---|---|
| 2024/0020948 | A1* | 1/2024 | Ren | G06V 20/64 |
| 2024/0193404 | A1* | 6/2024 | Maaz | G06V 10/764 |
| 2024/0242064 | A1* | 7/2024 | Chan | G06N 3/08 |
| 2024/0282131 | A1* | 8/2024 | Ren | G06V 10/7753 |
| 2024/0338831 | A1* | 10/2024 | Park | G06V 10/44 |
| 2025/0022269 | A1* | 1/2025 | Li | G06N 3/0499 |
| 2025/0278930 | A1* | 9/2025 | Kim | G06N 3/094 |

OTHER PUBLICATIONS

LiT: Zero-Shot Transfer with Locked-image text Tuning, by Zhai et al. arXiv:2111.07991 [cs.CV], Jun. 22, 2022 (Year: 2022).*

* cited by examiner

*Primary Examiner* — Ping Y Hsieh
*Assistant Examiner* — Heath E. Wells
(74) *Attorney, Agent, or Firm* — Fish & Richardson P.C.

(57) ABSTRACT

Methods and systems for generating a feature map from an image is disclosed. The vision system includes a vision model or processing the image to generate the feature map according a neural network. The vision model includes a first convolutional block for downsampling a set of image data to obtain a first stage convoluted data; a second convolutional block for downsampling the first stage convoluted data to obtain a second stage convoluted data, wherein one or both of the first convolutional block and the second convolutional block is a mobile convolution block (MBConv) that includes: a first Gaussian Error Linear Unit (GELU) layer, a depth-wise convolution (DWConv) layer having, and a resizing convolution layer; and a transformer block (TFB) generating the feature map from the second stage convoluted data.

20 Claims, 6 Drawing Sheets

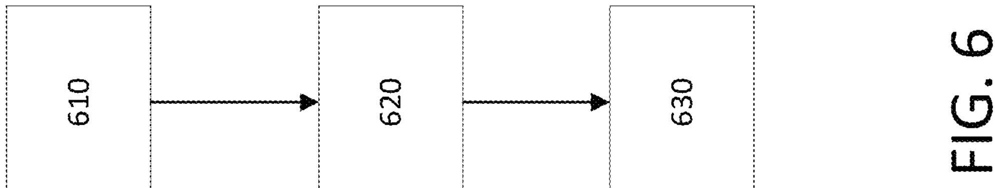
FIG. 6
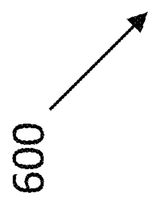

HYBRID MODEL FOR VISION SYSTEMS

FIELD

The embodiments described herein pertain generally to methods and systems for training and implementing vision models having a hybrid model for identifying features in images. More specifically, the embodiments described herein pertain to a hybrid model having mobile convolutions block(s) and transformer block(s) for extracting the features from input images and/or generating feature map(s) based on the input images.

BACKGROUND

Computer vision systems have been developed using machine leaning models that are implemented by neural network(s) trained to recognize object(s) in images. The macro-architecture of the neural networks generally includes of a number of computational blocks that sequentially process an image input into feature map(s) that may be recognizable by a subsequent operation to generate human readable materials (e.g., texts, images, audio) based on the feature map. The feature map(s) may be utilized by other computer systems or models as input to extract or generate useful information about the image input for further processing.

The neural network may be developed to have an architecture for providing a framework to process the input image data. At the macro-level, the network architecture may include a set of blocks that processes the input image data and selectively weights and extracts features from the input data, from the previous layer, and output the extracted data to the next layer. The selective process of the neural network may be trained using a labeled data set (e.g., a database with image-text pairs that specify the images with their corresponding labels or descriptions for the content of the images). Each of the blocks, at a micro-level network design, can include further layers of nodes that can include further blocks for processing data. For characterizing the performance of one or more architecture designs, the system may be benchmarked for the accuracy (e.g., error rate) against the labeled data set (or a subset thereof), the speed and/or computational resources required to train and/or complete the encoding process for generating the output, and/or the like.

SUMMARY

The embodiments described herein pertain generally to methods and systems for training and implementing vision models having a hybrid model for identifying features in images. More specifically, the embodiments described herein pertain to a hybrid model having mobile convolutions block(s) and transformer block(s) for extracting the features from input images and/or generating feature map(s) based on the input images.

It is appreciated that, by having the macro-architecture and the micro-architecture of this disclosure, the vision model of the system can exhibit better data and model scalability and feature resolution than alternative models (e.g., a vanilla vision transformer (ViT), Convolution and Self Attention (CoAtNet), or the like). For example, scalability may be related to the performance of the vision model over a smaller dataset as opposed to a larger dataset. In an embodiment, the vision model includes a convolutional stem and a three-stage network for extracting features from image(s) and/or generating a feature map based on the provided image(s). It is appreciated that, by having the three-stage network, the vision model can provide a feature map with output stride of 16 (i.e., a downsampling factor of 16 from the image data prior to being processed by the vision model) in some embodiments.

It is further appreciated that, by having a two-stage mobile convolutional block (MBConv) sequentially downsampling the image data (or the stemmed image data from the convolutional stem block), the architecture of this disclosure has a lower number of MBConv blocks than alternative designs such that the computational resources required for the vision model might be lower than vision models that have a larger number of MBConv blocks. In an embodiment, the transformer block (TFB) is arranged to be the last block in obtaining the feature map for superior data and model scalability.

It is appreciated that the vision model of this disclosure may be used as an image encoder for a vision language model (VLM) that extracts contextual information from the image data and outputs machine readable data (e.g., a feature map representing the contextual information) and/or human readable texts based on the input image data. The vision model part of the VLM can be obtained from a trained neural network having the architecture as described in this disclosure. The neural network might be trained, for example, by a labeled dataset, a pretrained model (e.g., Contrastive Language-Image Pre-Training (CLIP)), or the like, that has text/image embedding.

It is further appreciated that, by having the architecture, the neural network can have fewer parameters compared, e.g., to the number of parameters in neural networks using an alternative architecture, allowing the stacking of additional transformer blocks toward deeper architectures and/or reducing the computational power required for training the network.

Obtaining the vision model of a Vision-Language model (VLM) may include training of a neural network for minimizing the loss function:

$$-\frac{1}{2N}\sum_{i=1}^{N}\left(\underbrace{\log\frac{e^{x_i^T y_i/T}}{\sum_{j=1}^{N} e^{x_i^T y_j/T}}}_{\text{image to text}}+\underbrace{\log\frac{e^{y_i^T x_i/T}}{\sum_{j=1}^{N} e^{y_i^T x_j/T}}}_{\text{text to image}}\right).$$

In the loss function, a batch of N image-text pairs can be $\{(I_1, T_1), \ldots, (I_N, T_N)\}$ where $I_i$ and $T_i$ denote image and text for $i^{th}$ pair. The objective is to align the image beddings $x_i$ and the text beddings $y_i$ for each pair in which $$x_i = \frac{f(I_i)}{\|f(I_i)\|_2} \text{ and } y_i = \frac{g(T_i)}{\|g(T_i)\|_2}.$$

The vision model, as discussed herein, and/or a text model can be trained to minimize the loss function above.

In an embodiment, by having a simple convolutional stem (e.g., having two identical 3 by 3 convolutional layers) and three-stage network hybrid architecture, the vision model can be trained with less computational resources and/or trained faster compared to alternative architectures while having a reduced number of parameters, e.g., half, quarter, or a tenth of the parameters. The vision model can further have a higher zero-shot evaluation accuracy over models trained with alternative architectures.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIG. 6 is a flow chart showing a method 600 of training a neural network, according to one or more embodiments.

DETAILED DESCRIPTION

Figure 1:
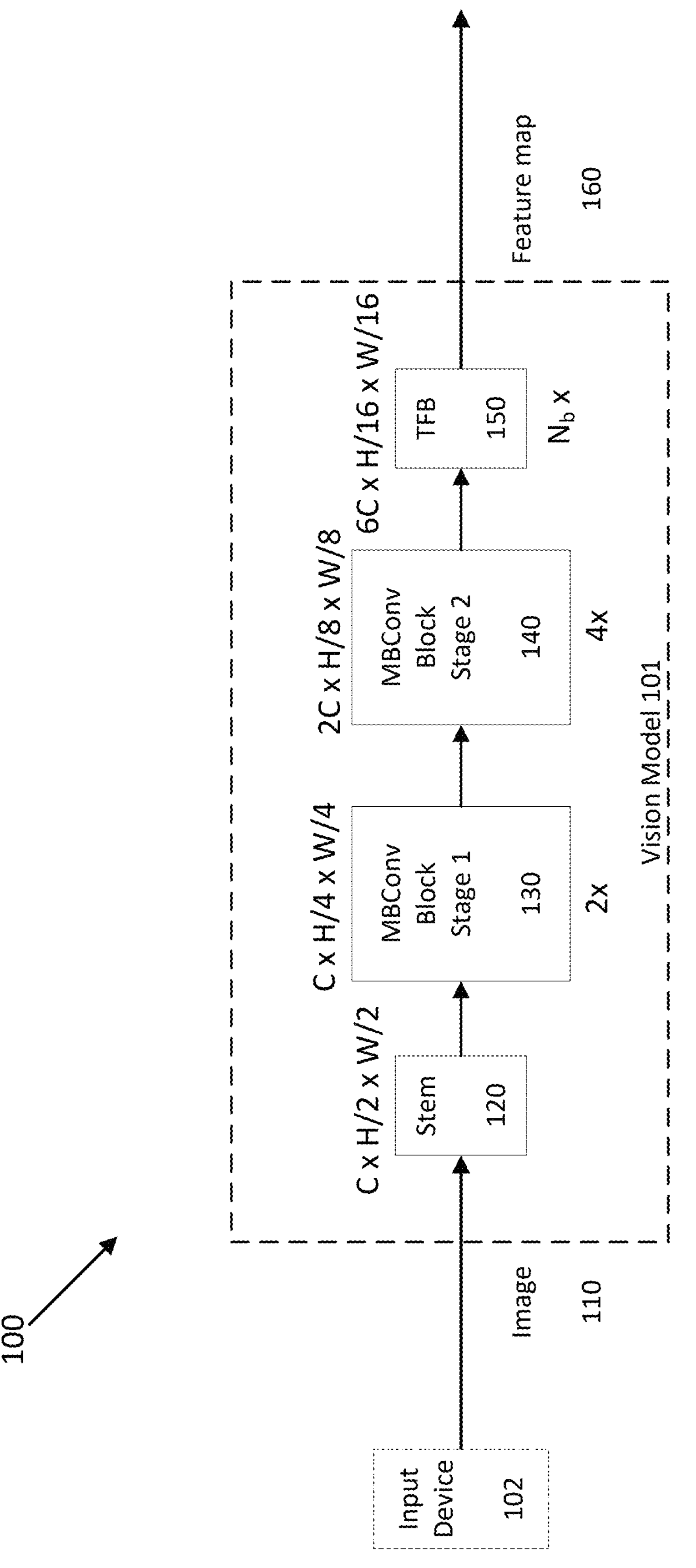
FIG. 1 shows a system in which a vision model may be implemented, according to one or more embodiments.

The embodiments described herein pertain generally to methods and systems for training and implementing vision models having a hybrid model for identifying features in images. More specifically, the embodiments described herein pertain to a hybrid model having mobile convolutions block(s) and transformer block(s) for extracting the features from input images and/or generating feature map(s) based on the input images.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "data" or "dataset" is a term of art and may refer to an organized collection of data stored and accessed electronically. In an example embodiment, data may refer to a database, a data table, a portion of a database or data table, etc. It is to be understood that data may correspond to one or more database tables, of which every column of a database table represents a particular variable or field, and each row of the database table corresponds to a given record of a dataset. The data may list values for each of the variables, and/or for each record of the data. It is also to be understood that a dataset may also or alternatively refer to a set of related data and the way the related data is organized.

As reference herein, "neural network" is a term of art that includes node layers, containing an input layer, one or more hidden layers, and an output layer. Each node connects to another and has an associated weight and threshold. If the output of any individual node is above the specified threshold value, that node is activated, sending data to the next layer of the network. Neural networks rely on training data to learn and improve their accuracy over time.

As reference herein, "self-attention" is a term of art in machine learning to retain relational information in previously rounds of training such that the subsequent rounds of trainings focus on the more relevant data/variables in the data presented in the model.

As reference herein, "convolutional layer" is a term of art in machine learning for any layer of computation that receives an input and provide an output base on a mathematical manipulation of the input.

As reference herein, "transformer block" is a term of art in machine learning that contains one or more layers for self-attention mechanisms, e.g., at each layer, each feature split can be contextualized within the scope of the context window with other (unmasked) features via a parallel multi-head attention mechanism allowing the signal for key features to be amplified and less important features to be diminished.

As reference herein, "convolution" is a term of art in machine learning that includes one or more mathematical manipulation of the image data over a filter (i.e., a patch of the image data, e.g., 1 by 1 pixel patch, 3 by 3, or the like) for optimization.

As reference herein, "activation function" is a term of art in machine learning that calculates the output of a node based on its inputs and the weights on the individual inputs.

As reference herein, "residual block" is a term of art in machine learning that a subnetwork with a certain number of stacked layers.

As reference herein, "model" can be algorithms and/or programs, hardware or firmware, or any combination thereof. By generating a model, e.g., the vision model, the weights and biases of the nodes in the neural network may be provided, e.g., into one or more algorithms and/or programs.

As reference herein, "spatial interaction" is a term of art that refers to some of the interactions strongly depend on geometries, such as the Euclidean distance and relative directions between objects in the images.

FIG. 1 shows a system 100 in which a vision model 101 may be implemented, according to one or more embodiments.

As shown in FIG. 1, the system 100 includes an input device 102 configured to provide one or more images 110 as an input. The input is provided to a vision model 101 configured to provide an output (e.g., a feature map) based on the one or more images 110 provided by the input. The vision model 101 may be a model produced by training a neural network having an architecture that includes, for example, a convolutional stem layer 102, a first stage Mobile Convolution Block 130 (MBConv), a second stage MBConv 140, and a transformer block (TFB) 150.

Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The input device 102 may refer to one or more embodiments of a computing environment that may be, or include, a computer, processing device, a microprocessor, a microcontroller, a digital signal processor, or any combination thereof. The input device 102 may be one of various electronic devices, or a combination thereof, having one or more images and/or video capturing components, i.e., camera and/or video recorder, display screens with audio and/or video inputs/outputs and that support the providing of and consumption of content relative to a media platform. The various electronic devices may include but not be limited to a security/surveillance device, smartphone, a tablet computer, a laptop computer, a desktop computer, an e-book reader, an MP3 (moving picture experts group audio layer III) player, an MP4, and/or any other suitable electronic devices. Non-limiting examples of the input device 102 as a security device may include a video doorbell, a vehicle dash-cam, a security camera (whether constantly active or motion-activated), etc. Additional non-limiting examples of input device 102 may include a database, local server, cloud-based service, a virtual reality (VR) and/or augmented reality (AR) servers, etc. Further, any algorithm or program described, recited, or suggested herein may be executed by one or more processors hosted on the input device 102.

The image 110, in accordance with at least some of the embodiments disclosed and recited herein, may refer to one or more digital images, for example, each having a size of H (height)×W (width) (e.g., 224 pixels by 224 pixels, 336 pixels by 336 pixels, or the like). In an embodiment, the image size may be 896 pixels by 896 pixels for open-vocabulary detection and 1344 pixels by 1344 pixels for segmentation tasks. In an embodiment, in training and/or validation, the image in the vision model of an embodiment may be resized (e.g., enlarged or downsized) to provide the same or similar image size as in other operations or comparative vision models, e.g., to fine-tune the vision model on larger image (or input) sizes.

The image 110 may be transmitted or otherwise communicated from the input device 102 to a receiving component corresponding to the vision model 101 via a wired or wireless network. Such network may be regarded as a medium that is provided as a bidirectional communications link between a media platform on which the vision model 101 is hosted and the input device 102. The network may include the Internet, a local area network (LAN), a wide area network (WAN), a local interconnect network (LIN), a localized cloud, or the like.

The vision model 101 is an implementation of a neural network. The vision model 101 can be, e.g., algorithms and/or programs, hardware or firmware, or any combination thereof, to categorize, detect, isolate, and/or localize objects and/or segments of interest in the image 110. In an embodiment, the vision model 101 may be an algorithm obtained according to a result from training of a neural network using one or more data sets. In an embodiment, the vision model 101 may include a neural network having the architecture as described in this disclosure. Training of the neural network can provide a machine learning model.

A non-limiting example of such model may include architecture blocks (e.g., MBConv, TFB, or the like) hosted on one or multiple servers, on the order of hundreds to thousands, which may be hosted on a cloud-based infrastructure. Further, the vision model 101 may be implemented by single or multiple classical computers, mobile devices, and facilitate transmissions with one or more of input devices 102 across single or multiple connections or channels.

The output of the vision model 101 may be a feature map 160 that can be any type of digital representations of the image 110 input that can be provided to subsequent operation(s) for expressing the detected features from the image 100 input. The expression may be in a human readable format or a machine readable format for further processing. In an embodiment, the subsequent operation of the vision model (such as the vision model 101 having a hybrid architecture as shown in FIG. 1) may be a text transformer implemented by a Contractive Language-Image Pretraining (CLIP) architecture.

The block 120 is a convolutional stem block configured to process the image 110. The convolutional stem can be configured for reducing resolution of the image to reduce noise and/or reduce computational load needed for subsequent operations. The vision model 101 processes the image 110 through the block 120 to obtain a set of image data (e.g., stemmed image data), that are then processed by the block 130. It is appreciated that, the convolutional stem block 120 can have convolutional layers that sequentially process received data as described with respect to FIG. 2.

The blocks 130 and 140 can be MBConv blocks that each includes one or more layers for downsampling stemmed image data and determining features presented in the stemmed image data provided by the block 120. In an embodiment, the blocks 130 and 140 downsample the stemmed image data in two stages. It is appreciated that the blocks 130 and 140 can each have layers to sequentially process the stemmed image data as described with respect to FIG. 3.

In an embodiment, the block 130 can be a first stage MBConv that receives the stemmed image data to provide the first stage convoluted data. The block 140 can be a second stage MBConv that receives the first stage convoluted data to provide the second stage convoluted data.

Figure 4:
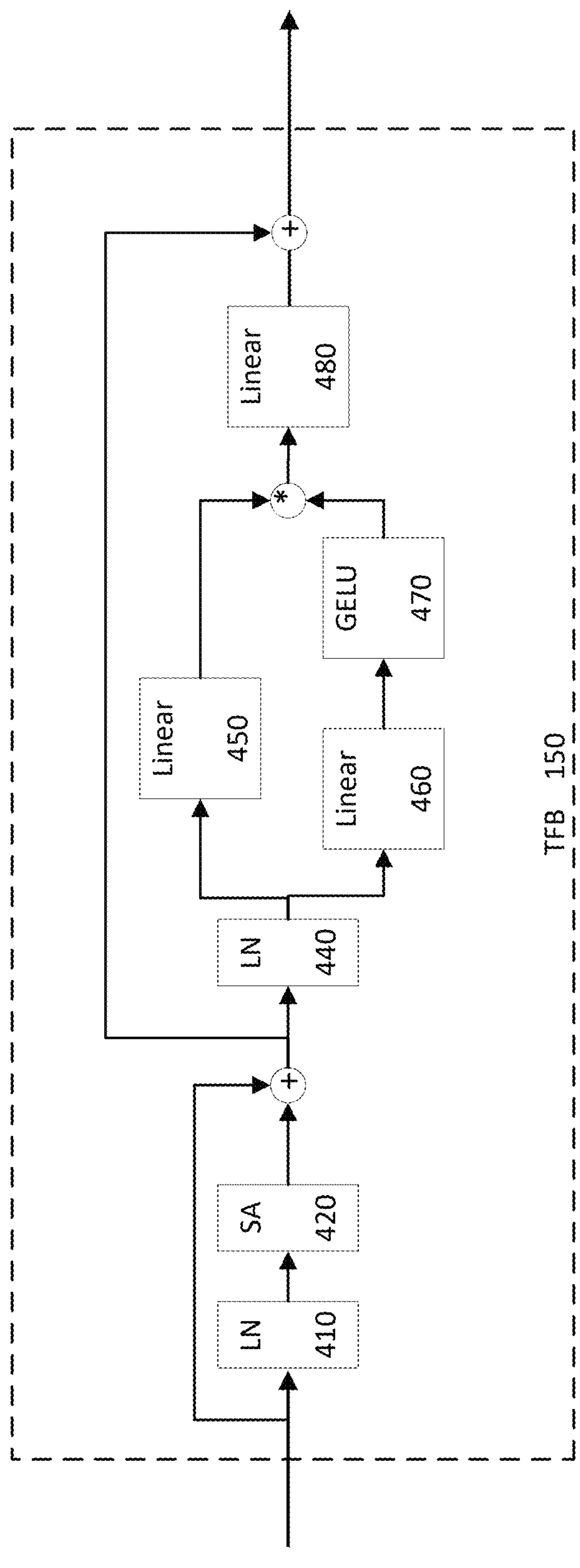
FIG. 4 shows a micro-level architecture design of a TFB block, according to one embodiment.

The block 150 can be a TFB configured to provide self-attention mechanism in detecting features for generating the feature map from the second stage convoluted data from the block 140 as further described with respect to FIG. 4.

With respect to the scaling rule of the blocks, in an embodiment, the block 120 has a number of channels of C that processes image size of H/2 (e.g., a height of 224 pixels divided by 2) by W/2. It is appreciated that the number of channels C may be 64, 128, 160, or the like. The block 130 has a number of channels of 2 that processes image size of H/4 by W/4 such that the block 130 may have the same number of channels C as the block 120.

In an embodiment, the stride for the blocks progressively increases across the blocks 120-150. For example, the stride for the block 110 can be 2, the stride for the block 120 can be 4, the stride for the block 140 can be 8, and the stride of the block 150 can be 16. It is appreciated that "stride" may be a term of art in machine learning that represent a parameter that dictates the movement of the kernel, or filter, across the input data, such as an image. When performing a convolution operation, the stride determines how many units the filter shifts at each step.

In an embodiment, the image size processed by the blocks are progressively reduced across the blocks 120-150. For example, the block 120 can have an image size of H/2×W/2, the block 130 can have an image size of H/4×W/4, the block 140 can have an image size of H/8×W/8, and the block 150 can have an image size of H/16×W/16.

The number of channels can progressively increase among the MBConv and TFB blocks (e.g., blocks 130, 140, 150, having a number of channels of C, 2C, and 6C respectively). In an embodiment, the convolutional stem block (e.g., block 120) and the first stage MBConv block (e.g., block 130) can have the same number of channels C.

In some embodiments, the number of channels C, 2C, 6C might be 64, 128, 384; 128, 256, 768; 160, 320, 1024; or the like. It is appreciated that the number of channels might not be the exact multiple of C (e.g., 2 times of C for 2C, 6 times of C for 6C or the like) with respect to the channel number C.

The convolutional stem block (e.g., block 120) can have a number of blocks of 2 in some embodiments. In an embodiment, the convolutional stem block can have the same number of blocks as the first stage MBConv block. The two stages of MBConv block can have a progressively increasing number of blocks (e.g., the block 120 having a number of blocks of 2 and the block 130 having a number of blocks of 4). The TFB block may have a number of blocks larger than the other blocks, or having the largest number of blocks. In an embodiment, the TFB block may have a number of blocks ($N_b$) of 14 or 31.

It is appreciated that, by having the macro-architecture as shown in FIG. 1, the vision model 101 of the system 100 can exhibit better data and model scalability and feature resolution than alternative models (e.g., VIT, CoAtNet, or the like). In an embodiment, the vision model 101 uses a convolutional stem (e.g., block 110) and three-stage network (e.g., blocks 130, 140, and 150) for processing an image to obtain a feature map based on the provided image. It is appreciated that, by having three-stage network (e.g., blocks 130, 140, and 150), the vision model 101 provides a feature map with an output stride of 16 (i.e., a downsampling factor of 16 from the image data prior to being processed by the vision model 101).

It is appreciated that, by having the architecture, the neural network can have fewer parameters compared, e.g., to the number of parameters in neural networks using an alternative architecture, allowing the stacking of additional transformer blocks toward deeper architectures and/or reducing the computational power required for training the network.

It is further appreciated that, by having two-stage MBConv (blocks 130 and 140) sequentially downsampling the image data (or the stemmed image data from the block 120), the vision model 101 can contain a lower number of blocks (e.g., block 130 having 2 blocks and block 140 having 4 blocks) than alternative designs such that the computational sources required for the vision model 101 might be lower than vision models having a larger number of MBConv blocks.

In an embodiment, the TFB block (e.g., 140) is arranged to be the last block in obtaining the feature map for superior data and model scalability, by, for example, by having two residual blocks, one with self-attention and the other with the feed-forward network, e.g., in which a first linear layer with GeGLU can be substituted with a Gated Linear Unit that has a 2×expansion rate. In some embodiments, such TFB block can have fewer parameters, e.g., less than 20%, 15%, 12%, 10%, or 5%. It is appreciated that performance may be characterized based on needed computational resources, zero-shot accuracy, or the like.

Figure 2:
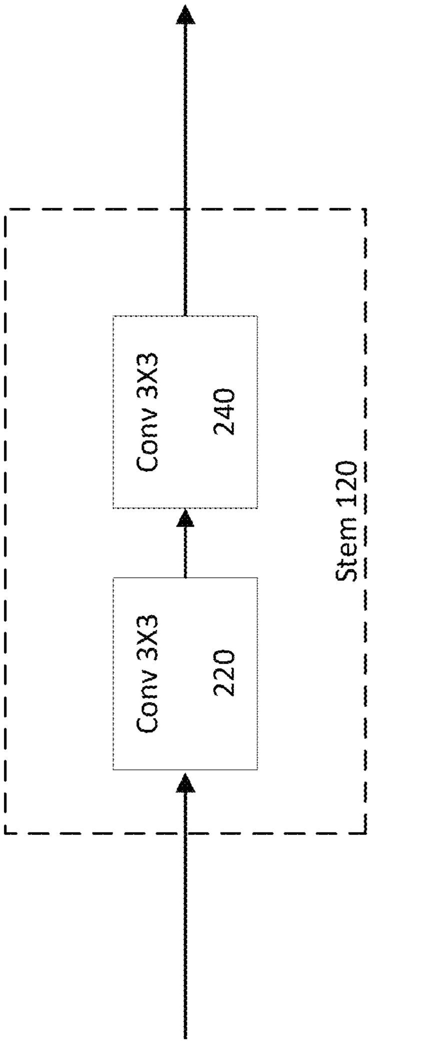
FIG. 2 shows a micro-level architecture of a convolutional stem block, according to an embodiment.

FIG. 2 shows a micro-level architecture of block 120, according to an embodiment. As shown in FIG. 2, the block 120 can be a convolutional stem block. The block 120 includes a first convolutional layer 220 and a second convolutional layer 240. In an embodiment, the first convolutional layer 220 can have a filter or kernel size of 3×3, for example, to lower the resolution of the image and reduce the computational resource needed for the subsequent layer(s) and/or block(s). The second convolutional layer 240 can have a size of 3×3, for example, to further lower the resolution of the image and further reduce the computational resource needed for the subsequent layer(s) and/or block(s). Is it appreciated that the size of 3×3 may be a filter or kernel size which might be a term of art such that the mathematical manipulation of the input image can be over an area of a first predetermined number of pixels by a second predetermined number of pixels (e.g., 3 pixels by 3 pixels as annotated as 3×3).

Figure 3:
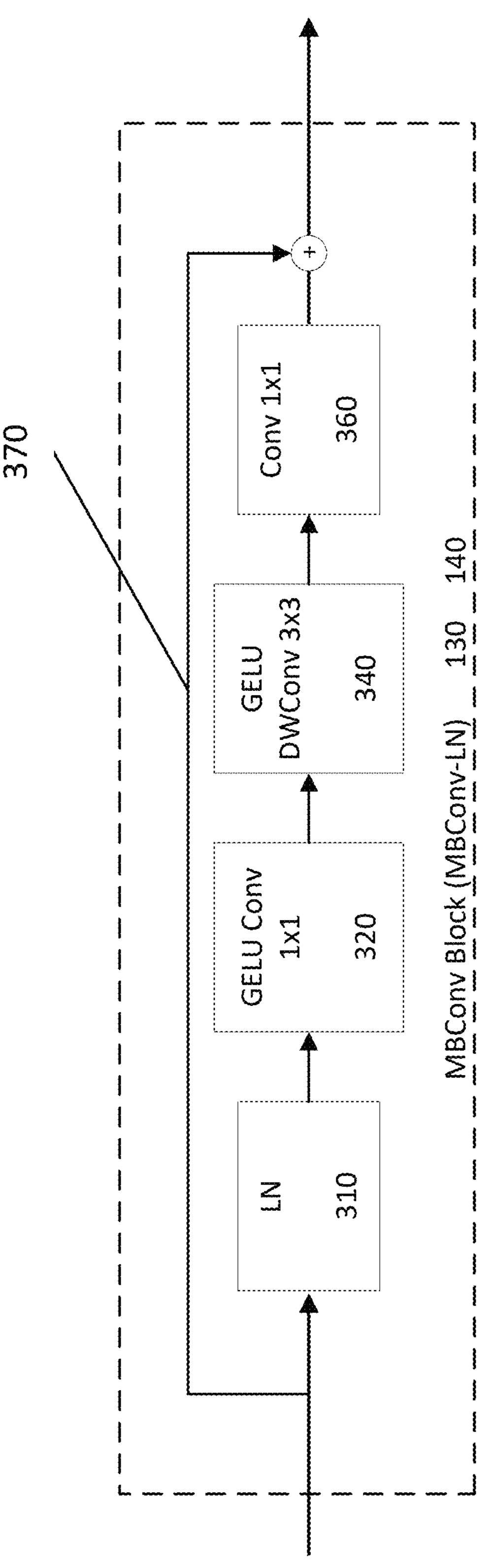
FIG. 3 shows a micro-level architecture of a MBConv block, according to an embodiment.

FIG. 3 shows a micro-level architecture of the block 130 or 140, according to an embodiment. It is appreciated that the MBConv blocks 130 and 140 may have the same micro-level architecture. However, the number of blocks, number of channels, stride, image size, or the like might be different for the blocks 130 and 140.

As shown in FIG. 3, the MBConv block includes a layer normalization (LN) layer 310, a Gaussian Error Lincar Unit (GELU) convolution layer 320, a GELU depth-wise (DWConv) convolutional layer 340, and a resizing convolutional layer 360. It is appreciated that GELU may include one or more activation functions to preserve nonlinearity in the image data. The DWConv may include an activation function configured for capturing the spatial interaction in the image data.

The LN layer 310 includes one or more activation functions to normalize the data from a prior layer or block, based on a reference value such as the average value of the data, the standard deviation, and/or the like.

The GELU convolutional layer 320 includes one or more activation functions to preserve nonlinearity in the image data, retaining more information from the input data as opposed to, e.g., ReLU (e.g., a function used in alternative models that sets all negative values to zero). In an embodiment, the layer 320 can have a filter size of 1 pixel by 1 pixel for expanding the channel size.

The GELU DWConv layer 340 can be a convolutional layer having an activation function that captures the spatial interaction. In an embodiment, the layer 340 may have a filter size larger than 1 pixel by 1 pixel (e.g., 3 pixels by 3 pixels).

The resizing convolutional layer 360 can have a filter size of 1 pixel by 1 pixel to project the data back to the original channel size, e.g., the channel size C for block 130, 2C for block 140 of FIG. 1, or the like.

It is appreciated that the input data to the block 130 or 140 may be transmitted through the bypass 370 to be added to the output of the layer 360, e.g., to preserve the history of prior training information. Accordingly, the sum of the output from the layer 360 and the input to the block 130 may be provided as the output for the block 130. In an embodiment, the sum of the output from the layer 360 and the input to the block 140 may be provided as the output for block 140.

It is appreciated that the block 130 and/or 140 is configured to have an inverted bottleneck structure such that the channel size of the data input to the block is expanded at the layer 320 and returned to the original channel size at layer 360. By having the inverted bottleneck structure, numerous batch normalization layers (BN), squeeze-and-excitation layer (SE) may be omitted to simplify the architecture and/or reduce the computational resources required for training the neural network that employs the architecture for the vision model 101 as described in the present disclosure. It is appreciated that the LN layer being a first layer of the block functions like a pre-normalization layer in TFB in the MBConv block(s) (e.g., block 130, block 140, and/or the like). Accordingly, in an embodiment, while the BN and SE layers are omitted in the vision model 101, by having the LN layer (e.g., 310, 410 (shown in FIG. 4), or the like) being the first layer of some, or all of, the blocks (e.g., blocks 130, 140, and/or 150), the performance of the vision model 101 can be similar to that of MBConv-BN-SE block(s) in other architectures while having a more simplistic structure, thus requiring less computational resources and/or time in the training.

FIG. 4 shows a micro-level architecture design of block 150, according to one embodiment. As shown in FIG. 4, the block 150 is a TFB configured for extracting features in the data to generate a feature map as an output. The block 150 can be a GELU Gated Linear Unit (GeGLU). The block 150 can include a self-attention residual block and a feed-forward network (FFN) residual block for extracting more relevant features from the provided data. It is appreciated that the residual block may be a computational block within the block 150. In an embodiment, the self-attention residual block includes a LN layer 410, and a self-attention (SA) layer 420. The FFN includes a LN layer 440, a linear layer 450, a linear layer 460, a GELU layer 470, and a linear layer 480.

The LN layer 410 and 440 can each include one or more activation functions to normalize the data from a prior layer or block based on a reference value (e.g., the average value of the data, the standard deviation, and/or the like). The SA layer 420 transforms input data and focuses on parameters and/or features in the input data that are more relevant to generating the feature map. The linear layers 450, 460, 480 can be configured for linear transformation or regression to train the weights and bias in the network. The GELU layer 470 can include one or more activation functions to preserve nonlinearity through the layer, retaining more information from the input data.

It is appreciated that the output of the LN layer 440 may be the input for the linear layer 450 that processes the data to provide an output of the linear layer 450. The output of the LN layer 440 may be the input for the linear layer 460 and subsequently processed by the GELU 470. The output of the linear layer 450 and the output of the GELU 470 may be multiplied to collect the weight and bias information from the linear layer 450 and the GELU layer 470. The multiplication of the output of the linear layer 450 and the output of the GELU 470 is processed at the linear layer 480 for further adjustment to the weight and bias in the training of the network. The input of the LN layer 440 is then added to the output of the linear layer 480 for providing the feature map as an output of the block 150. It is further appreciated that, in some embodiments, by having an expansion rate of two times (e.g., 2×expansion rate), the GeGLU block may enhance the accuracy in the FFN residual block. The GeGLU block results in fewer parameters in some embodiments compared, e.g., to the number of parameters in neural networks using an alternative TFB architecture, allowing the stacking of additional transformer blocks toward deeper architectures.

Figure 5:
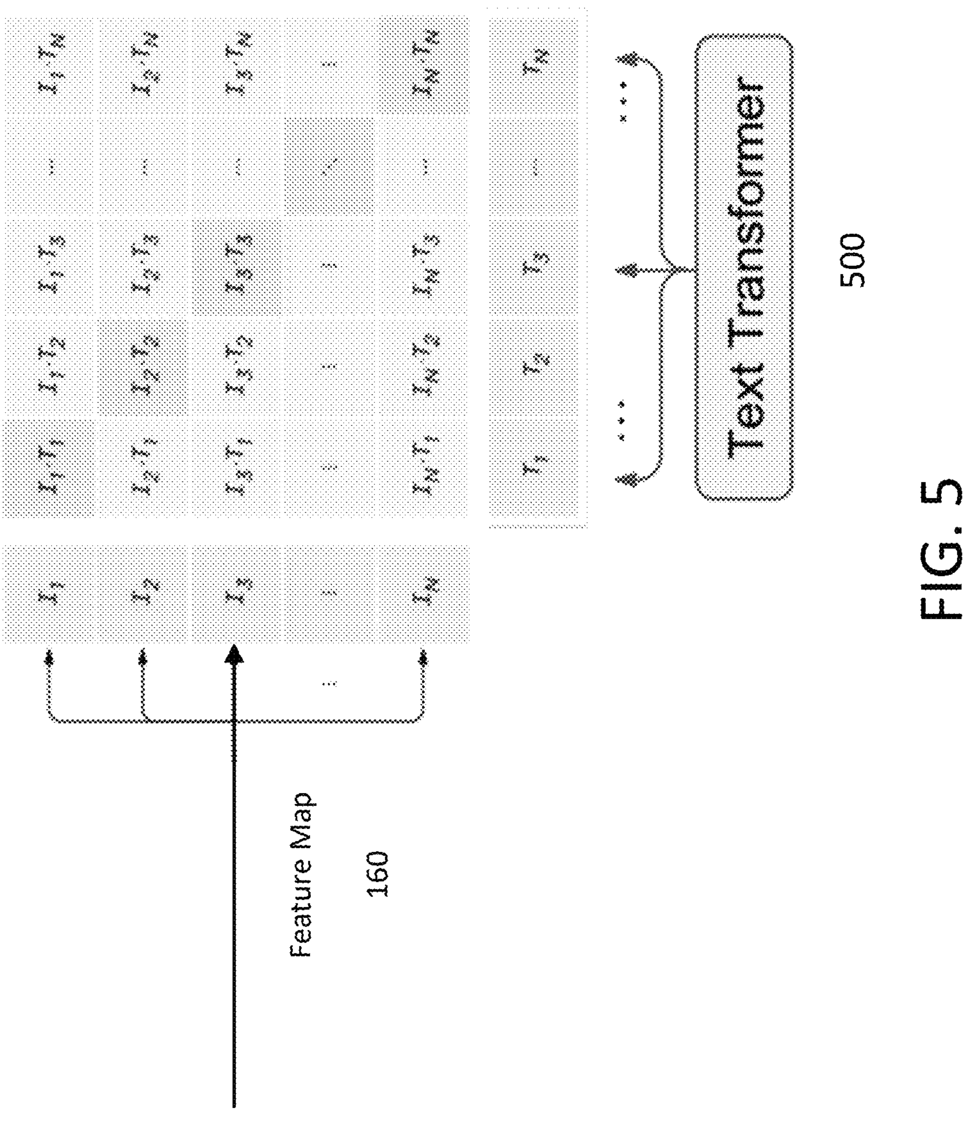
FIG. 5 shows a structure of a text transformer for processing a feature map, according to an embodiment.

FIG. 5 shows a structure of a VLM having the image encoder, e.g., a vision model, according to an embodiment. The VLM can include the vision model, as discussed above, and a text transformer. That is, the collective of the vision model 101 (shown in FIG. 1) and the text transformer 500 can be referred as a VLM that translates/extracts the contextual information in the image data as the input to the vision model 101 into an output that described the contextual information as machine readable information (e.g., a feature map), human readable texts, and/or the like. In some embodiments, the VLM can be configured for processing a feature map provided as an output of the vision model, in which the text transformer 500 is configured to align the features in the feature map with text output describing the image input. In some embodiments, the text output with the lowest contrastive loss may be selected as the text output corresponding to the feature map.

In an embodiment, the vision model may be trained using the VLM of FIG. 5 such as a dataset of the CLIP framework having N image-text pairs, in which the vision model's output $I_i$ may be configured to align with its corresponding text Transformer's output $T_i$, e.g., by a labeled data set for that reducing a contrastive loss of the loss function to at or below a predetermined contrastive loss threshold value. The vision model can then be trained by using the labeled dataset, e.g., from the CLIP framework, having image-text pairs and iteratively trained until the loss function is to at or below a predetermined contrastive loss threshold value or minimized.

FIG. 6 is a flow chart showing a method 600 of training a neural network, according to one or more embodiments. The neural network can be developed to have an architecture for providing a framework to process the input image data. At the macro-level, the network architecture may include a set of blocks as described with respect to FIGS. 1-5 above.

The blocks are configured to process the input image data and selectively weight and extract features from the input data, from the previous layer, and output the extracted data to the next layer.

As shown in FIG. 6, the method 600 begins with initializing the text encoder (e.g., the text transformer 500 of FIG. 5) 610. The text encoder may be initialized for training of a neural network to be trained with Locked-Text Tuning (LTT) method. LTT can use one of the pre-trained models such as a previously trained vision model 101 (shown in FIG. 1), CLIP, and/or the like.

For example, in an embodiment, a pre-trained model (e.g., OpenCLIP) and dataset (e.g., DataComp-1B) may be used. Training may include short schedule training and/or long schedule trainings. The short schedule trainings may have a patch size of 8000, 16000 images, or the like. 32 A100 GPUs might be used for conducting the training. Number of iterations (i.e., the number of epochs) over the image data may be 1. Time for training may be 1.8, 3.3, or 5.6 days. The long schedule trainings might have a batch size of 90000, using 184 A100 GPUs, 10 epochs, and 11 days of training time. In an embodiment, the short schedule trained models are configured to benchmark the models and conduct ablation studies. The long schedule trained models are configured to obtain the vision model. In an embodiment, the sample size of the images may be 200 million seen samples on a large image size (e.g., 336 by 336 pixels). The method 600 then proceeds to 620.

At 620, the values in the text encoder are frozen and used to train an image encoder, such that the feature correlation, weight, and biases from the text encoder can be used to train the image encoder, e.g., iteratively training the vision model by adjusting parameters, weights, and/or biases of the various layers and/or blocks of the vision model. The method 600 then proceeds to 630.

At 630, the image encoder is randomly initialized and trained by the frozen text encoder. For example, the text encoder may be a text encoder with a CLIP framework (e.g., CLIPA-v2, OpenCLIP, or the like), the text transformer 500 of FIG. 5, a large multi-modal model, or the like.

In an embodiment, the vision model can be iteratively trained to minimize the loss function:

$$-\frac{1}{2N}\sum_{i=1}^{N}\left(\underbrace{\log\frac{e^{x_i^T y_i/T}}{\sum_{j=1}^{N} e^{x_i^T y_j/T}}}_{\text{image to text}}+\underbrace{\log\frac{e^{y_i^T x_i/T}}{\sum_{j=1}^{N} e^{y_i^T x_j/T}}}_{\text{text to image}}\right).$$

In the loss function, a batch of N image-text pairs can be $\{(I_1, T_1), \ldots, (I_N, T_N)\}$ where $I_i$ and $T_i$ denote image and text for $i^{th}$ pair. The objective is to align the image beddings $x_i$ and the text beddings $y_i$ for each pair in which $$x_i = \frac{f(I_i)}{\|f(I_i)\|_2} \text{ and } y_i = \frac{g(T_i)}{\|g(T_i)\|_2}.$$

When the loss function is minimized, e.g., reaches a predetermined value, the training is ended. In an embodiment, the resulting vision model can be the image encoder that can be an implementation of a trained neural network having an architecture shown in the system 100 having the vision model 101 as shown in FIG. 1.

In some embodiments, benchmarking can be used to characterize, evaluate, and/or compare the performance of architectures for a neural network according to different architecture designs to identify relevant features (or blocks) from the different architectures and/or generate a model with the identified relevant features, e.g., to generate improved models having the relevant features or blocks. According to some embodiments, benchmarking the performance of the neural network might include measuring the performance of the upstream task(s) and/or the downstream task(s) to provide a holistic evaluation of the network, the vision model, and/or the vision-language model (VLM). Upstream tasks may include evaluating classification capability and/or retrieval capability, e.g., against a labeled data set (e.g., image-text pairs). For example, retrieval may include the vision model, e.g., in a VLM, that retrieves an image from the dataset based on an input such as a text input describing the image to be retrieved. Classification may include the vision model classify the images in a dataset into one or more of a plurality of classes. In an embodiment, the benchmarking can include evaluating the performance of downstream tasks, e.g., in open-vocabulary detection and segmentation, Large Multi-modal Model (LMM) and/or the like.

In some embodiments, validation may be used to validate vision model(s). Validation may include validating the vision model based on certain model capabilities such as classification capability, retrieval capability, open-vocabulary detection capability, and large multi-modal model performance or the like, and/or further for data scalability, model scalability, and feature resolution.

In an embodiment, validation may include validating the vision model based on the zero-shot accuracy of some or all of the capabilities such as classification capability and the retrieval capability. In an embodiment, the vision model may be validated by validating the vision model to minimize the contrastive loss and/or until a contrastive loss according a loss function is reduced to a predetermined threshold.

For example, open-vocabulary detection and segmentation may include panoptic segmentation and semantic segmentation. In an embodiment, for open-vocabulary object detection, the F-ViT (i.e., a two-stage detector baseline built on frozen CLIP ViTs) framework can be utilized. For open-vocabulary segmentation, the FC-CLIP (i.e., shared Frozen Convolutional CLIP) framework and zero-shot evaluation on multiple segmentation datasets can be used.

For example, a LMM can include the vision model (as a part of the VLM) according to an embodiment as vision encoders within the LMM. The vision model/VLM may provide image embedding that is well-aligned with text, thereby bridging the visional comprehension gap for LLM (Large Language Models). In an embodiment, LLaVA (Large Language-and-Vision Assistant)-1.5 can be the evaluation LMM framework.

In an embodiment, the F-ViT and/or FC-CLIP frameworks can be utilized for benchmarking. In an embodiment, the VLMs can be plug-in frozen back bones for F-VIT, FC-CLIP, or the like, for evaluating open-vocabulary detection and/or segmentation, respectively. The features may be extracted in a sliding window manner, with the window size equal or similar to the pre-training image size. In such evaluation, the image encoder for use in VLMs according to this disclosure may be 1.4% more accurate than ViT-L/14 on a Common Objection in Context dataset (e.g., a OV-COCO novel $AP_{50}$) with a pretraining dataset (e.g. DataComp-1B). Further, VLMs according in this disclosure also outperforms image encoders (e.g., ViT-L/14, ConvNeXt-L, or the like) in the FC-CLIP framework, trained on COCO, on a zero-shot evaluation (e.g., the accuracy of the output of the VLM over a data set that has not been previously evaluated by the VLM) for open-vocabulary segmentation tasks. Additionally, LLaVA-1.5 can be used as the evaluation framework for providing image embedding that is well-aligned with texts. When benchmarking in LLaVA-1.5, using dataset in VLMs described in this disclosure outperforms VLMs such as ViT-L/14 or CLIPA-v2. It is appreciated that the dataset can be ImageNet, Visual Question Answering V2.0 data, or the like.

In an embodiment, a test bed for designing vision models under the CLIP framework using the DataComp-1B dataset (i.e., datasets with high quality provided, e.g., by DataComp) is provided. Specifically, two training protocols (short schedule and long schedule) can be employed. The short schedule can be used for fast benchmarking vision models across model and data scales on DataComp-1B. The long schedule can be used for training best performing vision models on DataComp-1B. With the short schedule, re-benchmark state-of-the-art vision models can be found on ImageNet settings for VLMs. It is appreciated that "test-bed" may be a term of art for a hardware and/or software environment configured for testing the performance of the vision model.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile or non-transitory memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects: It is appreciated that any one of aspects can be combined with each other.

Aspect 1. A vision system for generating a feature map from an image, the vision system comprising:

- a vision model configured for processing the image to generate the feature map implemented on a neural network, wherein the vision model comprises:
  - a first convolutional block for downsampling a set of image data to obtain a first stage convoluted data;
  - a second convolutional block for downsampling the first stage convoluted data to obtain a second stage convoluted data, wherein
    - one or both of the first convolutional block and the second convolutional block is a mobile convolution block (MBConv) that includes: a first Gaussian Error Linear Unit (GELU) layer, a depth-wise convolution (DWConv) layer having, and a resizing convolutional layer; and a transformer block (TFB) generating the feature map from the second stage convoluted data.

Aspect 2. The vision system of aspect 1, wherein the GELU layer, having a first kernel size and a first channel size, is configured to expand the first channel size to a second channel size.

Aspect 3. The vision system of aspect 1 or 2, wherein the resizing convolutional layer is configured to return to the second channel size to the first channel size.

Aspect 4. The vision system of any one of aspects 1-3, wherein the DWConv layer, having a second kernel size, is configured for capturing spatial interaction.

Aspect 5. The vision system of any one of aspects 1-4, wherein the vision model further comprises a stem convolutional block having two identical kernel sized convolutional layers, the stem convolutional block processing the image to obtain stemmed image data that are provided as the set of image data to the first convolutional block.

Aspect 6. The vision system of any one of aspects 1-5, wherein a number of blocks and a number of channels progressively increase from the first convolutional block to the second convolutional block and to the TFB.

Aspect 7. The vision system of any one of aspects 1-6, wherein the TFB comprises a self-attention (SA) residual block and a feed-forward network (FFN) residual block.

Aspect 8. The vision system of aspect 7, wherein a first layer in the SA residual block includes a layer normalization (LN) layer.

Aspect 9. The vision system of aspect 7 or 8, wherein a first layer in the FFN residual block is a layer normalization (LN) layer.

Aspect 10. The vision system of any one of aspects 7-9, wherein an output of a layer normalization (LN) layer of the FFN is provided to both a first linear layer and a second linear layer, and an output of the second linear layer is processed by a second GELU layer.

Aspect 11. The vision system of aspect 10, wherein an output of the first linear layer and an output of the second GELU layer are combined to provide an input of a subsequent linear layer for generating the feature map.

Aspect 12. The vision system of any one of aspects 1-11, wherein the neural network is trained with a Contrastive Language-Image Pretraining (CLIP) framework.

Aspect 13. The vision system of any one of aspects 1-13, wherein the neural network is trained with Locked-Text Tuning that includes:

initializing a text encoder with a pre-trained model;

freezing the text encoder that is initialized with the pre-trained model; and training the neural network to obtain the vision model, wherein the training includes training with an image dataset to determine weights of nodes in the neural network until a loss function is less or equal to a predetermined value.

Aspect 14. A method for generating the vision model of any one of aspects 1-13, the method comprising:

benchmarking a plurality of vision models in a test-bed of models, the test-bed is configured to benchmark the plurality of vision models according to a short schedule for fast benchmarking the vision models under a contrastive language-image pretraining (CLIP), and a long schedule for determining performance of the plurality of vision models, wherein the benchmarking includes analyzing the plurality of vision models on at least classification capability, retrieval capability, open-vocabulary detection capability, or large multi-modal model performance for data scalability, model scalability, and feature resolution; and generating the vision model based on the short schedule and the long schedule.

Aspect 15. The method of aspect 14, wherein the benchmarking includes analyzing the plurality of vision models on the classification capacity and the retrieval capacity, and one or both of the open-vocabulary detection capability or the large multi-modal model performance.

Aspect 16. The method of any one of aspects 1-13, further comprising training the vision model by initializing a text encoder with a pre-trained model;

freezing the text encoder that is initialized with the pre-trained model; and training a randomly initialized image encoder, using an image dataset having a plurality of image-text pairs, for obtaining the neural network.

Aspect 17. The vision system of any one of aspects 1-13, wherein the vision model is generated by fitting the data set, having a plurality of image-text pairs, to determine weights of the nodes such that a contrastive loss is below a predetermined threshold.

Aspect 18. A method of validating the vision model according to any one of aspects 1-13, the method comprising:

processing an image dataset using the vision model; and validating the vision model based on classification capability, retrieval capability, open-vocabulary detection capability, and large multi-modal model performance for data scalability, model scalability, and feature resolution.

Aspect 19. The method of aspect 18, wherein the validating further comprises validating the vision model based on zero-shot accuracy on the classification capability and the retrieval capability.

Aspect 20. The vision system of any one of aspects 1-13, wherein the vision model is validated by validating the vision model until a constractive loss according a loss function is reduced to a predetermined threshold.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A vision system for generating a feature map from an image, the vision system comprising one or more computers and one or more storage devices storing instructions that, when executed by the one or more computers, cause the one or more computers to implement:

a vision model that processes the image to generate the feature map implemented on a neural network, wherein the vision model comprises:

a first convolutional block that downsamples a set of image data to obtain a first stage convoluted data;

a second convolutional block that downsamples the first stage convoluted data to obtain a second stage convoluted data, wherein one or both of the first convolutional block and the second convolutional block is a mobile convolution (MBConv) block that includes: a Gaussian Error Linear Unit (GELU) convolutional layer, a GELU depth-wise convolutional (DWConv) layer, and a resizing convolutional layer, wherein the GELU convolutional layer precedes the GELU DWConv layer in the MBConv block; and a transformer block (TFB) generating the feature map from the second stage convoluted data.

2. The vision system of claim 1, wherein the GELU convolutional layer, having a first kernel size and a first channel size, expands the first channel size to a second channel size.

3. The vision system of claim 2, wherein the resizing convolutional layer returns from the second channel size to the first channel size.

4. The vision system of claim 1, wherein the GELU DWConv layer, having a second kernel size, captures spatial interaction.

5. The vision system of claim 1, wherein the vision model further comprises a stem convolutional block having two identical kernel sized convolutional layers, the stem convolutional block processing the image to obtain stemmed image data that are provided as the set of image data to the first convolutional block.

6. The vision system of claim 1, wherein a number of blocks and a number of channels progressively increase from the first convolutional block to the second convolutional block and to the TFB.

7. The vision system of claim 1, wherein the TFB comprises a self-attention (SA) residual block and a feed-forward network (FFN) residual block.

8. The vision system of claim 7, wherein a first layer in the SA residual block includes a layer normalization (LN) layer.

9. The vision system of claim 7, wherein a first layer in the FFN residual block is a layer normalization (LN) layer.

10. The vision system of claim 7, wherein an output of a layer normalization (LN) layer of the FFN is provided to both a first linear layer and a second linear layer, and an output of the second linear layer is processed by a second GELU layer.

11. The vision system of claim 10, wherein an output of the first linear layer and an output of the second GELU layer are combined to provide an input of a subsequent linear layer.

12. The vision system of claim 1, wherein the neural network is trained with a Contrastive Language-Image Pre-training (CLIP) framework.

13. The vision system of claim 1, wherein the neural network is trained with Locked-Text Tuning that includes:

initializing a text encoder with a pre-trained model;

freezing the text encoder that is initialized with the pre-trained model; and training the neural network to obtain the vision model, wherein the training includes training with an image dataset to determine weights of nodes in the neural network until a loss function is less or equal to a predetermined value.

14. The vision system of claim 1, wherein the vision model is generated by fitting a data set, having a plurality of image-text pairs, to determine weights of nodes such that a contrastive loss is below a predetermined threshold.

15. The vision system of claim 1, wherein the vision model is validated by validating the vision model until a contrastive loss according to a loss function is reduced to a predetermined threshold.

16. A method for generating a vision model, comprising:

a first convolutional block that downsamples a set of image data to obtain a first stage convoluted data;

a second convolutional block that downsamples the first stage convoluted data to obtain a second stage convoluted data, wherein one or both of the first convolutional block and the second convolutional block is a mobile convolution (MBConv) block that includes: a Gaussian Error Linear Unit (GELU) convolutional layer, a GELU depth-wise convolutional (DWConv) layer, and a resizing convolutional layer, wherein the GELU convolutional layer precedes the GELU DWConv layer in the MBConv block; and a transformer block (TFB) generating a feature map from the second stage convoluted data, wherein the method comprising:

benchmarking a plurality of vision models in a test-bed of models, wherein the test-bed benchmarks the plurality of vision models according to a short schedule to fast benchmark the vision models under a contrastive language-image pretraining (CLIP), and a long schedule in determining performance of the plurality of vision models, wherein the benchmarking includes analyzing the plurality of vision models on at least classification capability, retrieval capability, open-vocabulary detection capability, or large multi-modal model performance in determining data scalability, model scalability, and feature resolution; and generating the vision model using the short schedule and the long schedule.

17. The method of claim 16, wherein the benchmarking includes analyzing the plurality of vision models on classification capacity and retrieval capacity, and one or both of the open-vocabulary detection capability or the large multi-modal model performance.

18. The method of claim 16, wherein the method further comprises training the vision model by:

initializing a text encoder with a pre-trained model;

freezing the text encoder that is initialized with the pre-trained model; and training a randomly initialized image encoder, using an image dataset having a plurality of image-text pairs, for obtaining a neural network.

19. A method of validating a vision model comprising:

a first convolutional block that downsamples a set of image data to obtain a first stage convoluted data;

a second convolutional block that downsamples the first stage convoluted data to obtain a second stage convoluted data, wherein one or both of the first convolutional block and the second convolutional block is a mobile convolution (MBConv) block that includes: a Gaussian Error Linear Unit (GELU) convolutional layer, a GELU depth-wise convolutional (DWConv) layer, and a resizing convolutional layer, wherein the GELU convolutional layer precedes the GELU DWConv layer in the MBConv block; and a transformer block (TFB) generating a feature map from the second stage convoluted data, wherein the method comprising:

processing an image dataset using the vision model; and validating the vision model using classification capability, retrieval capability, open-vocabulary detection capability, and large multi-modal model performance in determining data scalability, model scalability, and feature resolution.

20. The method of claim 19, wherein the validating further comprises validating the vision model using zero-shot accuracy on the classification capability and the retrieval capability.

* * * * *